United States Patent [19]

Shiota et al.

[11] Patent Number: 5,229,185
[45] Date of Patent: Jul. 20, 1993

[54] SPEAKER FRONT SHEET

[75] Inventors: Tomio Shiota, Osaka; Toshiharu Hikida, Kyoto, both of Japan

[73] Assignee: Matsushita Electric Industrial Co., Ltd., Osaka, Japan

[21] Appl. No.: 782,474

[22] Filed: Oct. 25, 1991

[30] Foreign Application Priority Data

Oct. 31, 1990 [JP] Japan ............... 2-295755

[51] Int. Cl.⁵ .................. B32B 3/10; B32B 7/14; B32B 23/02
[52] U.S. Cl. .................. 428/138; 428/196; 428/261; 428/343; 428/354
[58] Field of Search .......... 428/343, 354, 344, 196, 428/261, 138, 137, 194

[56] References Cited

U.S. PATENT DOCUMENTS

| 3,819,467 | 6/1974 | Kovac | 428/138 |
| 3,999,949 | 12/1976 | Andersson et al. | 428/138 X |
| 4,264,659 | 4/1981 | Pattenden | 428/196 X |
| 4,726,976 | 2/1988 | Karami et al. | 428/138 X |
| 4,803,111 | 2/1989 | Mansell | 428/138 X |

FOREIGN PATENT DOCUMENTS 657701  9/1951  United Kingdom .

*Primary Examiner*—George F. Lesmes
*Assistant Examiner*—D. R. Zirker
*Attorney, Agent, or Firm*—Pollock, VandeSande & Priddy

[57] ABSTRACT

A speaker front sheet capable of providing a sound outlet structure well matched in finishing with a cabinet of an apparatus equipped with a speaker is disclosed, wherein a plain gauze fabric is bonded on the front surface of a perforated sheet having a porosity greater than 30% and an adhesive layer is applied to the back surface of the perforated sheet.

4 Claims, 1 Drawing Sheet

SPEAKER FRONT SHEET

BACKGROUND OF THE INVENTION

1. Field of the Invention

The present invention relates to a speaker front sheet for use in a sound outlet structure of an apparatus equipped with a speaker.

2. Description of the Prior Art

A conventional sound outlet structure of an apparatus equipped with speakers, such as a television set, includes, as shown in FIGS. 4 and 5, a speaker grille SG formed from a coated wire net or a coated punching metal and attached by clinching or welding to a body of the apparatus. Another sound outlet structure comprises a portion of the body of an apparatus, the body portion having a number of small holes or perforations. In the case of a speaker box or cabinet, a grille composed of a fabric sheet stretched on a frame is provided.

The above-mentioned conventional sound outlet structure or grille using a wire net or a punching metal is not well matched in finishing with the body of the apparatus which is generally formed of a coated plastic. Due to a noticeable difference in finishing between the grille and the apparatus body, a sound producing source can readily be identified. However, the design of modern television sets is such that, if it becomes offensive to the enjoyment of screen images, it will lose the consumer's support. It is therefore desirable that a sound outlet structure has a surface finishing which is well matched with the finishing of a cabinet of the apparatus, thereby making it difficult for the consumer to identify a sound producing source of the apparatus.

SUMMARY OF THE INVENTION

With the foregoing drawbacks of the prior art in view, it is an object of the present invention to provide a speaker front sheet capable of providing a sound outlet structure which is well matched in finishing with the body of an apparatus equipped with a speaker.

A speaker front sheet of this invention comprises a perforated sheet having a porosity greater than 30%, a plain gauze fabric bonded to a front surface of the perforated sheet, and an adhesive layer applied to a back surface of the perforated sheet.

The speaker front sheet thus constructed provides a sound outlet structure (speaker grille) which is well matched in finishing with a cabinet of the apparatus which is generally formed of a coated plastic. Owing to a sufficient porosity (greater than 30%) of the perforated sheet, the speaker front sheet does not degrade the sound quality of a speaker. Perforations in the sheets are concealed by the plain gauze fabric provided on the obverse side of the speaker front sheet so that the speaker front sheet can be coated in the same texture as the coated plastic cabinet.

Preferably, the adhesive layer comprises a pressure-sensitive adhesive double coated tape having on its one surface a delustered foam adhesive layer bonded to the back surface of said perforated sheet. The delustered foam adhesive layer covers a lustrous surface of a substrate of the double coated tape which would otherwise be observed from the obverse side of the speaker front sheet through holes in the plain gauze fabric and perforations in the perforated sheet.

The above and other objects, features and advantages of the present invention will become more apparent from the following description when making reference to the detailed description and the accompanying sheets of drawings in which a preferred structural embodiment incorporating the principles of the present invention is shown by way of illustrative examples.

DETAILED DESCRIPTION OF THE INVENTION

The invention will be described below in greater detail with reference to a preferred embodiment illustrated in FIGS. 1A—3B of the accompanying drawings.

Figure 1A:
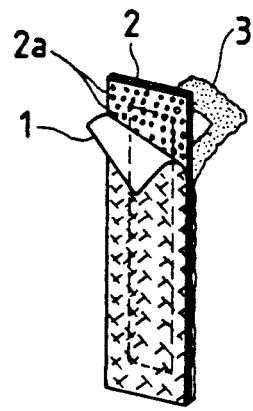
FIG. 1A is a perspective view showing the general construction of a speaker front sheet according to an embodiment of the present invention.
Figure 1B:
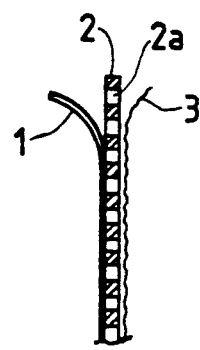
FIG. 1B is a cross-sectional view of the speaker front sheet.
Figure 2:
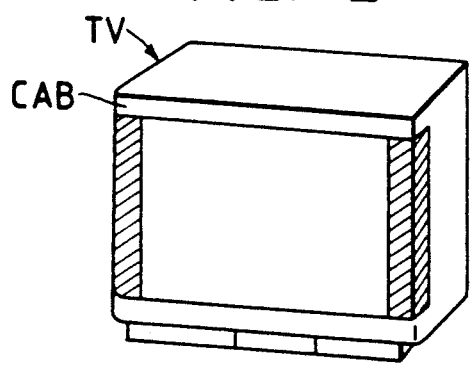
FIG. 2 is a perspective view of a television set to which a speaker front sheet of this invention is applied.

As shown in FIGS. 1A and 1B, a speaker front sheet according to this invention comprises a perforated sheet 2, a plain gauze fabric 1 bonded by an adhesive to a front surface of the perforated sheet 2, and an adhesive layer 3 applied to a back surface of the perforated sheet 2. The perforated sheet 2 has a multiplicity of small holes or perforations 2a formed in such a manner that the perforated sheet 2 has a porosity greater than 30%. The term "porosity" used herein refers to the ratio expressed in percentage of the total area of the perforations 2a in the sheet 2 to the entire area of that sheet 2 including the perforations 2a. The plain gauze fabric has a fine woven structure and is coated or dyed so as to provide the same color tone as a cabinet CAB (FIG. 2) of an apparatus equipped with speakers (a television set TV in the illustrated embodiment). The adhesive layer 3 extends along a peripheral portion of the perforated sheet so as not to hinder passage of sound waves through the speaker front sheet. The speaker front sheet of the foregoing construction is attached by the adhesive layer 3 to a sound outlet portion (indicated by hatching in FIG. 2) of the cabinet CAB of the television set TV.

Though not shown, the sound outlet portion of the cabinet has an annular surface adapted to be bonded with the adhesive layer 3 of the speaker front sheet, and an opening or recess for receiving a speaker unit.

The plain gauze fabric 1 is treated by a suitable processing such as dyeing, coating, flocking or a combination thereof so as to conform to the finishing of the cabinet CAM. The perforated sheet 2 in the illustrated embodiment is a sheet of polyvinyl chloride, however, this is not restrictive and the material and thickness of the perforated sheet 2 can be determined depending on the manner in which the speaker front sheet is bonded to the cabinet side.

The adhesive layer 3 on the back surface of the speaker front sheet may be a spread paste adhesive, a hot-melt adhesive, a pressure-sensitive adhesive double coated tape, etc. The material for the adhesive layer 3 is selected in view of a necessary bonding strength.

Figure 3A:
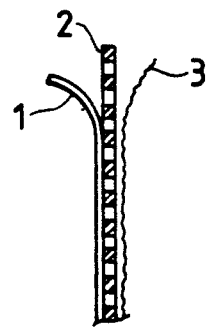
FIG. 3A is a cross-sectional view of the speaker front sheet shown in FIG. 2.
Figure 3B:
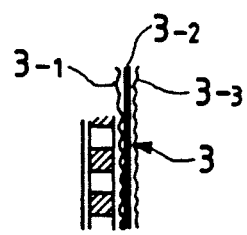
FIG. 3B is an enlarged view of a portion of FIG. 3A.
Figure 4:
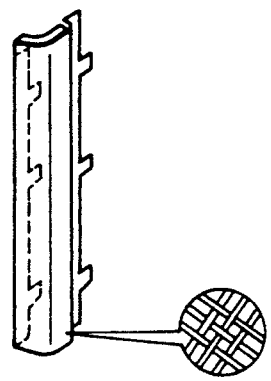
FIG. 4 is a perspective view a conventional speaker front sheet.
Figure 5:
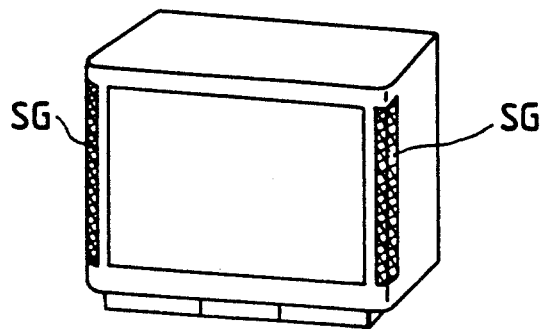
FIG. 5 is a perspective view of a television set in which the conventional speaker front sheet is incorporated.

As shown in FIG. 3(b), the adhesive layer 3 comprises a pressure-sensitive adhesive double coated tape having a multilayered structure. The double coated tape 3 includes a first adhesive layer 3-1 made from a foamable adhesive coated on one surface of a substrate 3-2, and a second adhesive 3-3 composed of a pressure-sensitive adhesive coated on the opposite surface of the substrate 3-2. The first adhesive layer 3-1 is bonded to the back surface of the perforated sheet 2, while the second adhesive layer 3-3 is adapted to adhere to the cabinet CAB. The foamable adhesive of the first adhesive layer 3-1 is preferable because upon foaming, it provides a delustered appearance or texture and covers a lustrous surface of the substrate 3-2 of the double coated tape 3 which would otherwise be observed from the front side of the speaker front sheet through openings in the plain gauze fabric 1 and though the perforations in the perforated sheet 2. To blow or foam the foamable adhesive to form a delustered foam adhesive layer 3-1, the double coated tape 3 is pressed with heat by means of a hot press, not shown, forced against the backside of the double coated tape 3 on which the second adhesive layer 3-3 is coated.

As described above, the speaker front sheet of this invention provides a sound outlet structure which is well matched in finishing with the cabinet of an apparatus equipped with a speaker and hence is able to improve the product value of the apparatus.

Obviously, various minor changes and modifications of the present invention are possible in the light of the above teaching. It is therefore to be understood that within the scope of the appended claims the invention may be practiced otherwise than as specifically described.

What is claimed is:

1. A speaker front sheet comprising:
    a perforated sheet having a multiplicity of perforations formed such that said perforated sheet has a porosity greater than 30%, said perforated sheet having a front surface on one side and a back surface on an opposite side thereof;
    a plain gauze fabric bonded on said front surface of said perforated sheet; and
    an adhesive layer applied to said back surface of said perforated sheet along a peripheral portion of said perforated sheet.

2. A speaker front sheet according to claim 1, wherein said adhesive layer comprises a pressure-sensitive adhesive double coated tape having a delustered foam adhesive layer covering one surface of said double coated tape and bonded to said back surface of said perforated sheet.

3. A speaker front sheet according to claim 2, wherein said delustered foam adhesive layer is foamed by applying pressure with heat to a surface of said double coated tape opposite to said one surface of said double coated tape covered by said delustered foam adhesive layer.

4. A speaker front sheet according to claim 1, wherein said perforated sheet is a perforated polyvinyl chloride sheet, and said adhesive layer comprises a pressure-sensitive adhesive double coated tape, said double coated tape including a substrate, a delustered foam adhesive layer coated on one surface of said substrate and bonded to said back surface of said perforated polyvinyl chloride sheet, and a pressure-sensitive adhesive layer coated on an opposite surface of said substrate.

* * * * *